US006834335B2

(12) United States Patent
Fallah et al.

(10) Patent No.: US 6,834,335 B2
(45) Date of Patent: Dec. 21, 2004

(54) SYSTEM AND METHOD FOR REDUCING TRANSITIONS ON ADDRESS BUSES

(75) Inventors: Farzan Fallah, San Jose, CA (US); Yazdan Aghaghiri, Los Angeles, CA (US); Massoud Pedram, Los Angeles, CA (US)

(73) Assignees: Fujitsu Limited, Kawasaki (JP); University of Southern California, Los Angeles, CA (US)

( * ) Notice: Subject to any disclaimer, the term of this patent is extended or adjusted under 35 U.S.C. 154(b) by 225 days.

(21) Appl. No.: 10/215,848

(22) Filed: Aug. 9, 2002

(65) Prior Publication Data

US 2003/0051120 A1 Mar. 13, 2003

Related U.S. Application Data

(63) Continuation-in-part of application No. 10/162,010, filed on Jun. 3, 2002.
(60) Provisional application No. 60/298,233, filed on Jun. 13, 2001, and provisional application No. 60/297,614, filed on Jun. 11, 2001.

(51) Int. Cl.[7] .............................................. G06F 12/00
(52) U.S. Cl. ..................... 711/220; 711/202; 711/219
(58) Field of Search .............................. 711/202, 212, 711/219, 220

(56) References Cited

U.S. PATENT DOCUMENTS

2002/0019896 A1 * 2/2002 Fornaciari et al. .......... 710/100

OTHER PUBLICATIONS

"Working–Zone Encoding for Reducing Energy in Microprocessor Address Buses", Musoll et al., IEEE, vol. 6, No. 4, Dec. 1998.*

L. Benini, G. de Micheli, E. Macii, D. Sciuto, C. Silvano, "Asymptotic Zero–Transition Activity Encoding for Address Busses in Low–Power Microprocessor–Based Systems," IEEE *7th Great Lakes Symposium on VLSI*, Urbana, IL, pp. 77–82, Mar. 1997.

W. Fornaciari, M. Polentarutti, D. Sciuto, C. Silvano, "Power Optimization of System–Level Address Buses Based on Software Profiling," *CODES*, pp. 29–33, 2000.

L. Benini, G. De Micheli, E. Macii, M. Poncino, S. Quer, "System–Level Power Optimization of Special Purpose Applications: The Beach Solution," *IEEE Symposium on Low Power Electronics and Design*, pp. 24–29, Aug. 1997.

P.R. Panda, N.D. Dutt, "Reducing Address Bus Transitions for Low Power Memory Mapping," *IEEE European Design and Test Conference*, pp. 63–67, Mar. 1996.

E. Musoll, T. Lang, J. Cortadella, "Exploiting the locality of memory references to reduce the address bus energy," *Proceedings of International Symposium on Low Power Electronics and Design*, Monterey, CA, pp. 202–207, Aug. 1997.

M.R. Stan, W.P. Burleson, "Bus–Invert Coding for Low Power I/O," *IEEE Transactions on VLSI Systems*, vol. 3, No. 1, Mar. 1995.

M. Mamidipaka, D. Hirschberg, N. Dutt, "Low Power Address Encoding using Self–Organizing Lists," *International Symposium on Low Power Electronics and Design*, Aug. 2001.

(List continued on next page.)

*Primary Examiner*—Matthew Kim
*Assistant Examiner*—Hetul Patel
(74) *Attorney, Agent, or Firm*—Baker Botts L.L.P.

(57) ABSTRACT

An encoder and decoder provide coding of information communicated on buses. The encoder and decoder may use various combinations of techniques to reduce switching activity on an address bus.

24 Claims, 3 Drawing Sheets

OTHER PUBLICATIONS

S. Ramprasad, N.R. Shanbhag, I.N. Hajj, "A Coding Framework for Low–Power Address and Data Busses," *IEEE Transactions on VLSI Systems*, vol. 7, No. 2, Jun. 1999.

Y. Aghaghiri, F. Fallah, M. Pedram, "Irredundant Address Bus Encoding for Low Power," International Symposium on Low Power Electronics and Design, pp. 182–187, Aug. 2001.

L. Macchiarulo, E. Macii, M. Poncino, "Low–energy for Deep–submicron Address Buses," International Symposium on Low Power Electronics and Design, pp. 176–181, Aug. 2001.

S. Iman, M. Pedram, "POSE: Power Optimization and Synthesis Environment," Proc. Of 33rd Design Automation Conference, pp. 21–26, Jun. 1996.

P.P. Sotiriadis, A. Wang, A. Chandrakasan, "Transition Pattern Coding: An approach to reduce Energy in Interconnect".

N. Chang, K. Kim, J. Cho, "Bus Encoding for Low–Power High–Performance Memory Systems," 37th Conference on Design Automation, Jun. 2000.

P. Chang, E. Hao, Y.N. Patt, "Target Prediction for Indirect Jumps," 24th International Symposium on Computer Architecture, Jun. 1997.

J.E. Smith, "A Study of Branch Prediction Strategies," 8th International Symposium on Computer Architecture, pp. 202–215, May 1981.

Y. Shin, S.I. Chae, K. Choi, "Partial Bus–Invert Coding for Power Optimization of System Level Bus," ISLPED '98, pp. 127–129, Aug. 1998.

M.R. Stan, P. Burleson, "Low–Power Encodings for Global Communication in CMOS VLSI," IEEE Transactions on VLSI Systems, vol. 5, No. 4, Dec. 1997.

L. Benini, G. De Micheli, E. Macii, D. Sciuto, C. Silvano, "Address Bus Encoding Techniques for System–Level Power Optimization," DATE–98, pp. 861–866, Feb. 1998.

S. Komatsu, M. Ikeda, K. Asada, "Low Power Chip Interface based on Bus Data Encoding with Adaptive Code–book Method".

* cited by examiner

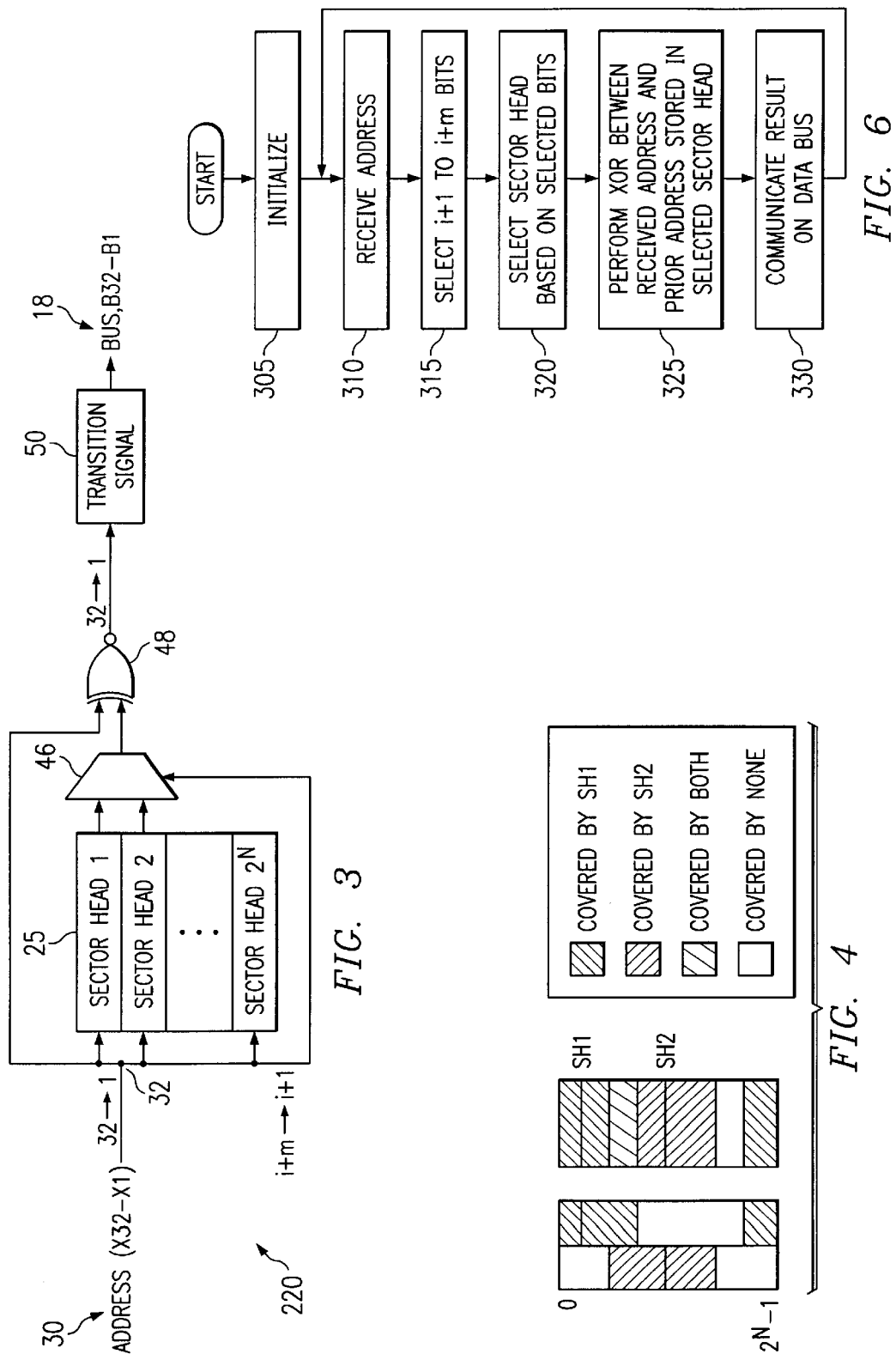

US 6,834,335 B2

SYSTEM AND METHOD FOR REDUCING TRANSITIONS ON ADDRESS BUSES

RELATED PATENT APPLICATIONS

This application is a continuation-in-part of U.S. patent application Ser. No. 10/162,010 filed Jun. 3, 2002, entitled "REDUCTION OF BUS SWITCHING ACTIVITY," which claims the priority under 35 U.S.C. §119 of provisional application Ser. No. 60/297,614 filed Jun. 11, 2001, entitled "ALBORZ: ADDRESS LEVEL BUS POWER OPTIMIZATION," and provisional application Ser. No. 60/298,233 filed Jun. 13, 2001, entitled "METHOD AND APPARATUS FOR BUS ENCODING."

TECHNICAL FIELD OF THE INVENTION

The present invention relates generally to circuit design and, more particularly, to reduction of bus switching activity.

BACKGROUND OF THE INVENTION

Current computer processors have a number of input-output (I/O) pins that dissipate a significant amount of energy. Many of the I/O pins are dedicated to interfacing to external memory chips through instruction address and data address buses or a multiplexed bus, which is used for both data and instruction addresses. The amount of energy dissipated from the I/O pins is often significant compared to total chip power consumption.

SUMMARY OF THE INVENTION

In accordance with the present invention, techniques for reducing transitions on address buses are provided. According to particular embodiments, these techniques reduce power consumption of electronic devices by reducing switching on address busses.

According to a particular embodiment, a method for reducing transitions on an address bus receives an address for communication to a memory on an address bus. The method computes a first offset between the received address and a first prior address and computes a second offset between the received address and a second prior address. The method selects the first offset in response to the first offset being less than the second offset. The method selects the second offset in response to the first offset not being less than the second offset. The method creates an irredundant codeword based, at least in part, on the selected offset and communicates the codeword on the address bus.

According to another embodiment, a method for reducing transitions on an address bus receives an address for communication to a memory on the address bus. The method associates the received address with a sector head. The method performs an exclusive-or operation between the received address and the prior address stored in the associated sector head. The method communicates the result of the exclusive-or operation on the address bus.

Embodiments of the invention may provide various technical advantages. Certain embodiments provide a number of working zones yet allow a processor to utilize an irredundant design. This irredundant design allows a zone register identifier and an offset to the corresponding zone register to be encoded in a codeword with the same width as the original patterns. Another potential advantage is dynamic updating of zones to improve power efficiency of the computer systems. A further potential advantage is reducing the number of gates.

Other technical advantages of the present invention will be readily apparent to one skilled in the art. Moreover, while specific advantages have been enumerated above, various embodiments of the invention may have none, some or all of these advantages.

BRIEF DESCRIPTION OF THE DRAWINGS

For a more complete understanding of the present invention and its advantages, reference is now made to the following descriptions, taken in conjunction with the accompanying drawings, in which:

FIG. 3 is a block diagram illustrating an encoder for encoding communications sent across the address bus of FIG. 1 using fixed-sector encoding;

FIG. 4 is a block diagram illustrating two sector heads and the related coverage sets in address space;

FIG. 6 is a flowchart illustrating a method for encoding communications sent across the address bus of FIG. 1 using fixed-sector encoding.

DETAILED DESCRIPTION OF THE DRAWINGS

Figure 1:
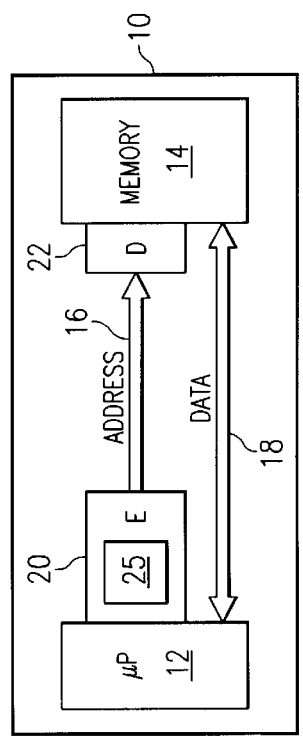
FIG. 1 illustrates a portion of a processing system for encoding communications sent across an address bus according to various embodiments of the present invention.

FIG. 1 is a portion of a processing system for encoding communications sent across memory buses, indicated at 10, that includes a microprocessor 12 and a memory 14 coupled to each other using an address bus 16 and a data bus 18. To reduce transitions on address bus 16, system 10 includes an encoder 20 that couples between microprocessor 12 and address bus 16 and includes a decoder 22 that couples between address bus 16 and memory 14. Encoder 20 includes at least two registers 25, hereinafter called sector heads or zoned registers. In general, encoder 20 and decoder 22 reduce transitions on address bus 16 using one or more encoding techniques. It will be understood that while these techniques are described using address bus 16, system 10 may use the invention to reduce transitions in a multiplexed bus (not shown).

In one aspect of operation, microprocessor 12 requests communications of data to and from memory 14 using address bus 16. Microprocessor 12 and memory 14 exchange data on data bus 18 based on the values of address bus 16. Setting values on address bus 16 and data bus 18 uses power, often proportionate to the number of changes in the value of the bus. For example, a change from an address of 00 hex to FF hex consumes more power than a change from 00 hex to 01 hex. Thus, reducing changes between spatially local addresses on address bus 16 reduces transitions and can reduce power consumption of the bus. Therefore, the addition of encoder 20 and decoder 22 can produce a net decrease in power consumption of system 10 by reducing transitions on address bus 16.

To reduce transitions on address bus 16, encoder 20 and decoder 22 use one or more techniques designed to reduce changes in spatially local values communicated on address bus 16. According to particular embodiments, encoder 20 and decoder 22 partitions memory address space into a plurality of sectors so that a trace of data addresses are divided into a plurality of sub-traces. Often, data addresses that are in the same sector have a tendency to be close to other addresses in the same sector. Thus, encoder 20 may encode each data address in a first sector with respect to the previous data address accessed in the first sector. Particular embodiments of encoder 20 utilize the virtual separation of addresses in the trace into sub-traces resulting in reduced transitions on address bus 16.

In a particular embodiment, encoder 20 incorporates a technique that implements dynamic sectoring. In this embodiment, encoder 20 partitions the address space into a first and a second sector. Encoder 20 then associates a first sector head 25 with the first sector and the second sector head 25 with the second sector. Each sector head 25 includes the value of the prior data address that was accessed in the appropriate sector. Encoder 20 receives a new address 30 (shown in FIG. 2) and computes a first offset and a second offset. Address 30 is an N-bit integer. For illustrative purpose only, address 30 may be represented as "X" and each bit as $X_1$ to $X_N$, where $X_N$ is the most significant bit (MSB). Each offset is computed by determining the distance between the current address 30 and the previous address. Encoder 20 selects the sector head 25 containing the closest prior address by determining the minimum offset. The incoming address 30 is then stored in the selected sector head 25. A code word is determined, based, at least in part, on the minimum offset and the appropriate sector head, and sent over address bus 16.

To determine the codeword, encoder 20 may perform least significant bit-inversion (LSB-Inv) on each offset. LSB-Inv inverts the least significant bits of the offset to reduce the number of binary ones within negative numbers. To reduce the frequency of binary ones, encoder 20 relies on the relative predictability of microprocessor operation. In many cases, offsets determined by encoder 20 will be relatively small. Thus for positive offsets, the offset will have relatively few ones (in binary notation). However, for negative offsets, the likelihood that the magnitude of these offsets will be relatively small increases the number of binary ones within the determined offset. For example, in two's compliment form, the value for negative one is represented by all ones (e.g., FFFF hex). For negative offsets, encoder 20 reduces the number of ones in the offset by converting the negative offset into sign/magnitude form or a variation of sign/magnitude form. According to particular embodiments, encoder 20 inverts all bits except for the most significant bit of a negative offset. For example, given an offset of FFFF hex (−1), encoder 20 would modify the offset into 8000 hex. As seen by this example, this can significantly reduce the number of ones in the determined offset using minimal processing. This processing may be illustrated by the following algorithm:

if($X \geq 0$) LSB-Inv($X$)=$X$ else

LSB-Inv($X$)=$X$ XOR($2^{N-1}-1$)

According to a particular embodiment, encoder 20 may, alternatively or in addition, use fixed partitioning of address space to reduce transitions on address bus 16. In this embodiment, encoder 20 partitions the address in a plurality of sectors. For example, encoder 20 may partition the address into two sectors. Encoder 20 determines which of the two sector heads 25 to use based on the MSB of address 30. Encoder 20 performs an exclusive-or operation between remaining bits of address 30 and the prior address stored in the appropriate sector head 25. The MSB and the output of the XOR operation are used to generate the codeword or transition signal. It will be understood that the partition may include any number of sectors, normally a power of two. Fixed-sector encoding may be simpler than dynamic-sector encoding and may further reduce delay overhead in system 10.

After generating a codeword, using any of the encoding techniques and any appropriate reduction in the frequency of ones, encoder 20 uses transition signaling to send the codeword on address bus 16. For transition signaling, encoder 20 uses address bus 16 to indicate only the difference between the coded offset and the previous value on the bus.

The preceding description details a number of techniques for reducing transitions on address bus 16. While these techniques have been described in particular arrangements and combinations, system 10 contemplates encoder 20 using any appropriate combination and ordering of these operations to provide for decreased transitions on address bus 16.

Figure 2:
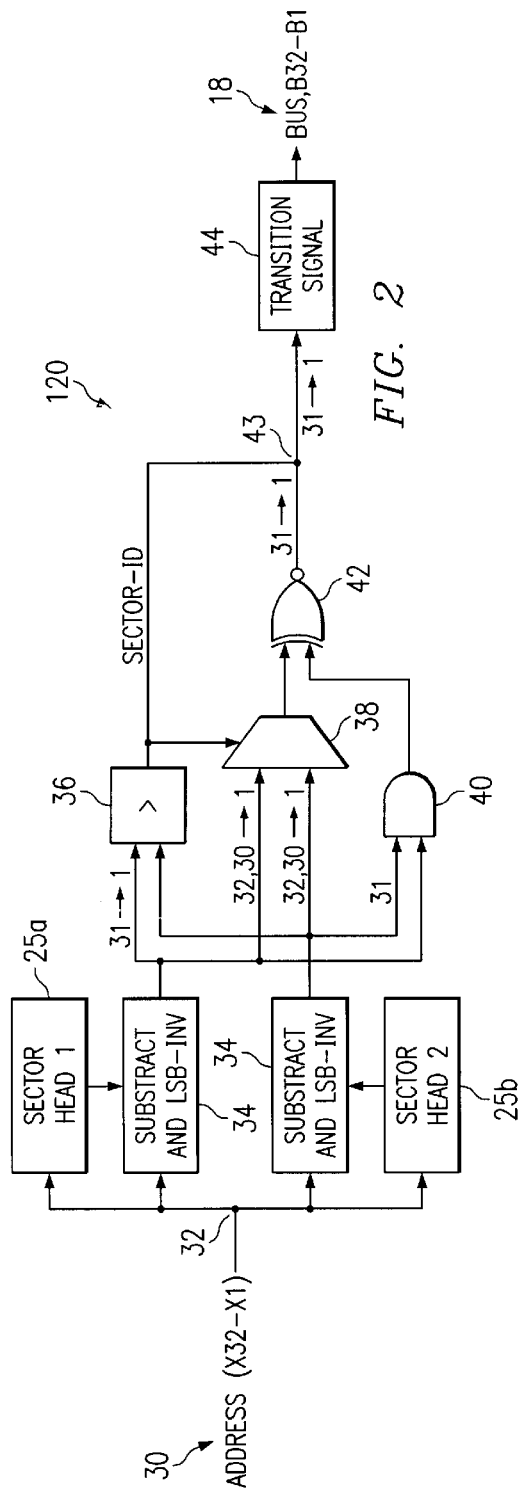
FIG. 2 is a block diagram illustrating an encoder for encoding communications sent across the address bus of FIG. 1 using dynamic-sector encoding.

FIG. 2 is a block diagram illustrating an encoder 120 for encoding communications sent across address bus 16 using dynamic-sector encoding. Encoder 120 receives an incoming address 30 at input 32. For example purposes only, address 30 is thirty-two bits. Each signal path includes specific ones of the thirty-two bits as are labeled for the path. For example, (32, 30→1) shows bit 32 and bit 30 to bit 1 are in the path.

First offset logic 34 receives the prior address stored in the first sector head 25. Second offset logic 34 receives the prior address stored in the second sector head 25. First offset logic 34 subtracts the stored prior address from the address 30 to determine a first offset. Second offset logic 34 subtracts its stored prior address from the address 30 to determine a second offset. Note that each offset will be a thirty-one bit word with bit 31 being the sign. Each offset logic 34 then performs LSB-Inv on the determined offset to reduce the number of binary ones in negative numbers. In one example, the prior address stored in the sector head 25 may be represented as "Y" and address 30 may be represented as "X".

dist $(X,Y)=R_{(N-1)-0}$ sign $(X,Y)=R_N$ where R=LSB-Inv(X-Y). Therefore, if "X" and "Y" are thirty-two bit words, then the dist(X, Y) will be thirty-one bits. As described above, the offset's sign is bit 31 and the offset's distance is bit 30 to bit 1. Each offset logic 34 communicates the sign of the respective offset to AND gate 40. Each offset logic 34 also communicates the remaining thirty bits of the respective offset to multiplexer 38.

Encoder 120 then selects between the first and second offset. If the second offset is greater than the first offset, as determined by greater-than module 36, a multiplexer 38 selects the first offset. Otherwise, multiplexer 38 selects the second offset. Multiplexer 38 communicates the selected offset to exclusive-or module 42.

Exclusive-or module 42 performs an exclusive-or operation between the output from multiplexer 38 and the output of AND gate 40. Exclusive-or module 42 concatenates the sign, in this example the thirty-first bit, and the offset, bit 30 to bit 1 At output 43, the sector ID, as bit 32, is concatenated with the current codeword bits 31 to 1 to obtain the transition signal 44. This processing may represented by the following algorithm:

```
S = min (dist(X,SH2), dist(X,SH2))
if (dist(X,SH1) < dist(X,SH2))
    M = sign(X,SH1)
else
    M = sign(X,SH2)
if (S_{N-1} = = 1)
    C(X,SH1;SH2) = NOT (M || S_{(N-2)-0})
else
    C(X,SH1;SH2) = M || S_{(N-2)-0}
``` where "S" is the selected offset, "M" is the sign of the offset, "SH1" is the first sector head 25, "SH2" is the second sector head 25, and C(X, SH1; SH2) is the encoded address. Thus, encoder 120 provides the coded address, as a thirty-two bit transition signal 44, at output 43 for communication on address bus 16.

FIG. 3 is a block diagram illustrating an encoder 220 for encoding communications sent across address bus 16 using fixed-sector encoding. Encoder 220 receives an incoming address 30 at an input 32. For example purposes only, address 30 is thirty-two bits. Each signal path includes selected ones of the thirty-two bits as labeled for the path. For example, (32, 30–>1) shows bit 32 and bit 30 to bit 1 are in the path.

In one embodiment, encoder 20 partitions the address space into two sectors. In some embodiments, multiplexer 46 may not be necessary. Encoder 20 determines which of the two sector heads 25 to use based on the MSB of address 30. The remaining bits of address 30 are XORed, using exclusive-or module 48, with the prior address stored in the appropriate sector head 25. The MSB and the output of the exclusive-or operation are used to generate the codeword. It will be understood that the partition may include any number of sectors, normally a power of two. Fixed-sector encoding may be simpler than dynamic-sector encoding and may further reduce delay overhead in system 10.

In particular embodiments including a plurality of sector heads 25 (illustrated as $2^M$ number of sector heads 25), encoder 220 may use the "M" most significant bits or it may select "M" middle bits to encode address using the appropriate sector head 25. For example, encoder 220 may partition the address into $2^M$ sectors. In this example, encoder 220 may select bit "i+1" to bit "i+M" from address 30, where "i" is a selected internal bit. These selected bits are communicated to multiplexer 46. Based on this input, multiplexer 46 selects the prior address stored in sector head 25 matching bit "i+1" to bit "i+M". Exclusive-or module 46 performs an exclusive-or operation between the remaining bits of address 30 and the prior address stored in the appropriate sector head 25. Bit "i+1" to bit "i+M" and the output of the exclusive-or operation are used to generate the codeword which is transition signaled with the previous value on the bus in 50.

FIG. 4 is a block diagram illustrating two sector heads 25 and the related coverage sets in address space using dynamic sectoring. As described above, the encoded address is one bit smaller than the address due to the MSB designating the sector head 25. Using the N–1 bits, each sector head 25 may cover $2^{N-1}$ addresses. The first set of addresses is represented by "S1" and the second set of addresses is represented by "S2". The size of "S1" and "S2" are substantially equal. Further, by adding $2^{N-1}$ or $-2^{N-1}$ to "S1", "S1" may be mapped to "S2".

The addresses in "S1" are covered by first sector head 25, represented by "SH1" in the diagram, and the second sector head 25 represented by "SH2". But the addresses in "S1" are encoded only with respect to the closest sector head 25. This results in overlap between the areas covered by the sector heads 25, with a portion of the address space not within coding range of any of the sector heads. Adding $2^{N-1}$ or $-2^{N-1}$ to the overlap section maps it to the out of range section.

Because only one sector head is selected to code into a particular location in the overlapping address space, one code is wasted. The wasted code may be used to encode an address in the out of range section.

This is accomplished by encoding the addresses with respect to the sector head 25 that is not closer. The corresponding decoder is thus signaled to map into the out-of-range address space, for example, by adding $2^{N-1}$ to the offset from sector head 25. It will be understood that dynamic sectoring is a one-to-one mapping.

Figure 5:
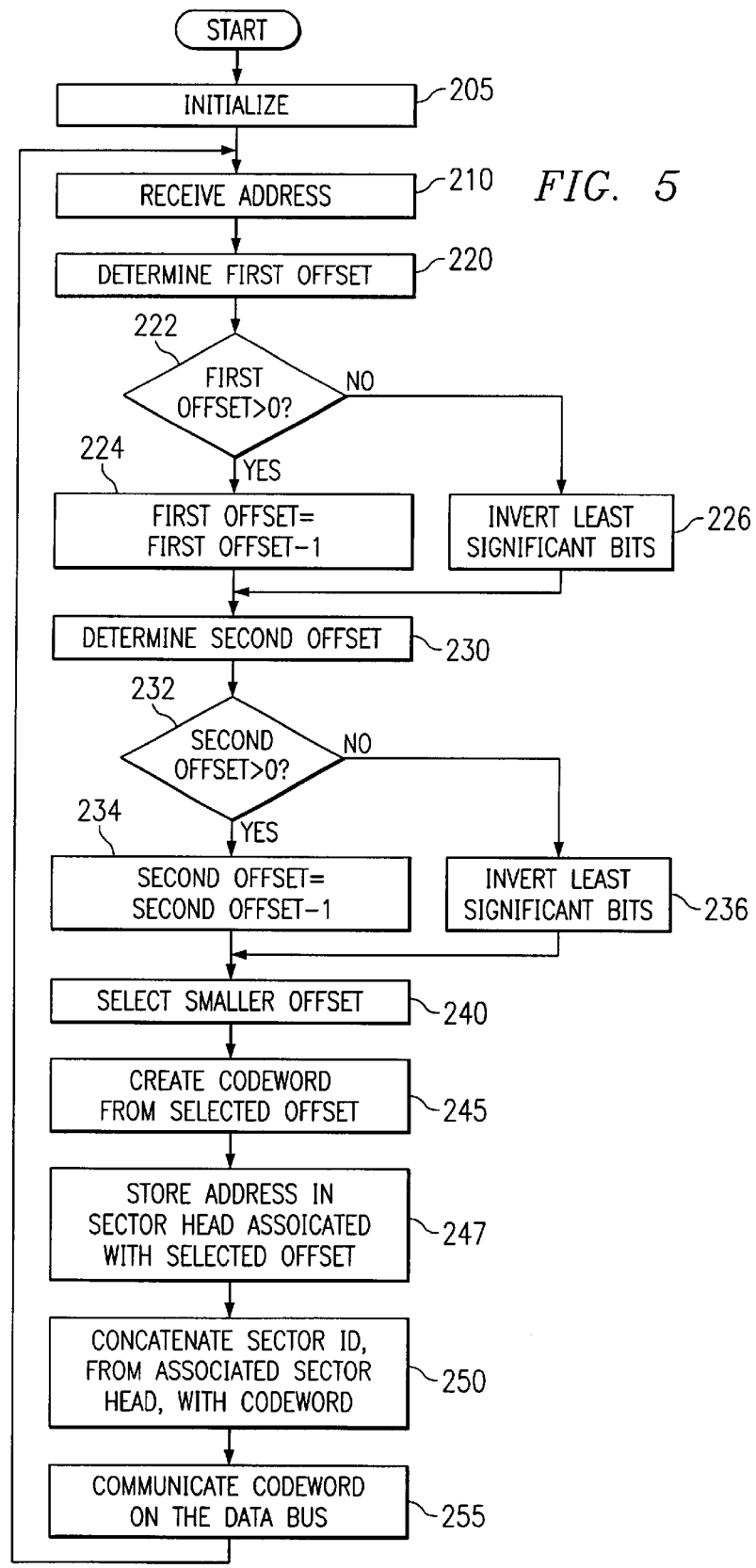
FIG. 5 is a flowchart illustrating a method for encoding communications sent across the address bus of FIG. 1 using dynamic-sector encoding.

FIG. 5 is a flowchart illustrating a method for encoding communications sent across address bus 16 using dynamic-sector encoding. The following description focuses on the operation of encoder 120, since this circuit diagram illustrates functional elements that provide for this encoding scheme. However, as noted, system 10 contemplates using any suitable combination and arrangement of functional elements for providing these operations, and these techniques can be combined with other techniques as appropriate.

Encoder 120 initializes at step 205. For example, encoder 120 may set initial values for sector heads 25. Encoder 120 receives an address 30 at step 210. At step 220, encoder 120 determines a first offset from a prior address in the first sector head 25. For example, using offset logic 34, encoder 120 may determine the offset between the address received at input 32 and the previous address maintained within the first sector head 25. Encoder 120 determines whether the first offset is greater than zero at step 222. If so, encoder 120 converts the offset by subtracting one at step 224. If the offset is not greater than zero, encoder 120 converts the offset by inverting least significant bits of the offset at step 226.

Execution proceeds to step 230, where encoder 120 determines a second offset from a prior address in the second sector head 25. For example, using offset logic 34, encoder 120 may determine the offset between the address received at input 32 and the previous address maintained within the second sector head 25. Encoder 120 determines whether the second offset is greater than zero at step 232. If so, encoder 120 converts the offset by subtracting one at step 234. If the offset is not greater than zero, encoder 120 converts the offset by inverting least significant bits of the offset at step 236.

Encoder 120 selects the smaller offset at step 240. In one embodiment, encoder 120 may select the first offset if the first offset is less than the second offset. If the second offset is less than or equal to the first offset, then encoder 120 selects the second offset. At step 245, encoder 120 creates a codeword 43 from the selected offset. The code word is transition signaled with the previous value on the bus in 44. For example, if address 30 is thirty-two bits, then the selected offset will be thirty-one bits, with thirty bits for the distance and bit 31 for the sign. The selected offset is concatenated with the sector-ID. The resulting codeword will be thirty-two bits.

Execution proceeds to step 247, where encoder 120 stores address 30 in the sector head 25 containing the selected offset. Encoder 120 then concatenates the sector ID identifying the sector head 25 containing the selected offset with the codeword at step 250. Returning to the example, this results in the codeword being thirty-two bits. At step 255, encoder 120 communicates the codeword on address bus 16. This combination of operations will, in many circumstances, result in reduced transitions, thus providing lower power consumption for circuits implementing these techniques.

FIG. 6 is a flowchart illustrating a method for encoding communications sent across address bus 16 using fixed-sector encoding. Because this method operates similar to the functioning of encoder 220, the following description will focus on the operation of encoder 220 in performing this method. However, as with the previous flowchart, system 10 contemplates using any appropriate combination and arrangement of logical elements implementing some of all of the described functionality.

Encoder 220 initializes at step 305. For example, encoder 220 may set initial values for sector heads 25. Encoder 220 receives an address 30 at step 310. At step 315, encoder 220 selects bit "i+1" to bit "i+M" from address 30, where "i" is potentially zero or a pre-selected internal bit. Encoder 220 selects, through multiplexer 46, the appropriate sector head 25, based on the selected bits. Based on this input, multiplexer 46 selects the prior address stored in sector head 25 matching bit "i+1" to bit "i+M". At step 325, encoder 220 performs an exclusive-or operation, using exclusive-or module 48, between the remaining bits of address 30 and the prior address stored in the appropriate sector head 25. Bit "i+1" to bit "i+M" and the output of the exclusive-or operation are used to generate the codeword. Encoder 220 communicates the codeword on address bus 16 at step 330. This combination of operations will, in many circumstances, result in reduced transitions, thus providing lower power consumption for circuits implementing these techniques.

The preceding flowcharts and accompanying descriptions illustrate exemplary methods of operation for encoding addresses into encoded addresses using various encoding schemes. However, these methods are merely illustrative, and system 10 contemplates encoder 20 implementing any suitable techniques for encoding target addresses using some or all of the disclosed methods. Thus, any or all of these techniques may be used separately and/or together as appropriate to reduce switching activity on address bus 16. Moreover, because the flowcharts and descriptions are only illustrative, system 10 contemplates encoder 20 using methods with additional steps, fewer steps, and/or different steps, so long as the methods remain appropriate.

In addition, while not explicitly illustrated, the operation and arrangement of elements within decoder 22 will depend upon the particular techniques implemented within encoder 20. That is, decoder 22 will function to reverse the encoding performed by encoder 20. For example, in one embodiment, decoder 22 may include the circuitry operable to perform the following algorithm:

$$U = \text{LSB-Inv}(Z_{N-1} \| 0 \| \{Z\}_{N-2})$$
$$\text{if } (Z_N = 0)$$
$$\quad X = SH_1 + U$$
$$\quad \text{if } (\text{dist}(X, SH_2) < \text{dist}(X, SH_1))$$
$$\quad\quad X + = 2^{N-1}$$
$$\text{else}$$
$$\quad X = SH_2 + U$$
$$\quad \text{if } (\text{dist}(X, SH_1) < \text{dist}(X, SH_2))$$
$$\quad\quad X + = 2^{N-1}$$
$$\text{if } (\text{dist}(X, SH_1) < \text{dist}(X, SH_2))$$
$$\quad SH_1 = X$$
$$\text{else}$$
$$\quad SH_2 = X$$

where "Z" is the received code after transition signaling. Therefore, system 10 contemplates decoder 22 having any suitable combination and arrangement of hardware and/or controlling logic that operates to decode coded addresses from address bus 16 based upon the operations performed within an encoder 20.

Although the present invention has been described in detail, it should be understood that various changes, substitutions and alterations can be made hereto without departing from the sphere and scope of the invention as defined by the appended claims.

To aid the Patent Office, and any readers of any patent issued on this application in interpreting the claims appended hereto, applicants wish to note that they do not intend any of the appended claims to invoke ¶6 of 35 U.S.C. §112 as it exists on the date of filing hereof unless "means for" is used in the particular claim.

What is claimed is:

1. An irredundant method for reducing transitions on an address bus, comprising:

receiving an address for communication to a memory on an address bus;

computing a first offset between the received address and a first prior address;

computing a second offset between the received address and a second prior address;

in response to the first offset being less than the second offset, selecting the first offset;

in response to the first offset not being less than the second offset, selecting the second offset;

creating an irredundant codeword based, at least in part, on the selected offset; and communicating the codeword on the address bus.

2. The method of claim 1, further comprising inverting selected bits of the first offset if the offset is negative.

3. The method of claim 1, wherein the first offset is associated with the first sector head and the second offset is associated with the second sector head.

4. The method of claim 3, wherein the first sector head is identified by a first sector ID and the second sector head is identified by a second sector ID and wherein creating an irredundant codeword comprises:

receiving the sector ID of the sector head associated with the selected offset; and concatenating the received sector ID with the selected offset into a transitional signal.

5. The method of claim 4, further comprising storing the received address in the sector head identified by the received sector ID.

6. The method of claim 4, further comprising performing an exclusive-or operation between the received address and the prior address stored in the sector head identified by the received sector ID.

7. An irredundant method for reducing transitions on an address bus, comprising:

receiving an address for communication to a memory on an address bus;

associating the received address with a sector head, wherein the sector head is one of at least two sector heads;

performing an exclusive-or operation between the received address and the prior address stored in the associated sector head; and communicating the result of the exclusive-or operation on the address bus.

8. The method of claim 7, wherein associating the received address with a sector head comprises:
selecting a subset of the plurality of bits from the received address; and
selecting a sector head based, at least in part, on the subset of the plurality of bits.

9. The method of claim 7, further comprising partitioning an address space into a plurality of sectors.

10. The method of claim 9, further comprising associating each of a plurality of sector heads with a unique sector.

11. The method of claim 10, wherein the number of sector heads is a power of two.

12. The method of claim 10, wherein associating the received address with a sector head comprises:
selecting a subset of the plurality of bits from the received address; and
selecting a sector head based, at least in part, on the subset of the plurality of bits and wherein the number of sector heads is equal to the number of selected bits.

13. An encoder comprising:
an input operable to receive an address;
an output coupled to an address bus;
a first sector head maintaining a first prior address received at the input;
a second sector head maintaining a second prior address received at the input;
a selection module operable to compute a first offset between the received address and the first prior address, compute a second offset between the received address and the second prior address, select the first offset in response to the first offset being less than the second offset, select the second offset in response to the first offset not being less than the second offset, create an irredundant codeword based, at least in part, on the selected offset, and communicate the codeword to the output.

14. The encoder of claim 13, further comprising circuitry operable to invert selected bits of the first offset if the offset is negative.

15. The encoder of claim 13, wherein the first offset is associated with the first sector head and the second offset is associated with the second sector head.

16. The encoder of claim 15, wherein the first sector head is identified by a first sector ID and the second sector head is identified by a second sector ID and the selection module is further operable to receive the sector ID of the sector head associated with the selected offset and concatenate the received sector ID with the selected offset into a transitional signal.

17. The encoder of claim 16, further comprising circuitry operable to store the received address in the sector head identified by the received sector ID.

18. The encoder of claim 16, further comprising an exclusive-or module operable to perform an exclusive-or operation between the received address and the prior address stored in the sector head identified by the received sector ID.

19. An encoder comprising:
an input operable to receive an address;
an output coupled to an address bus;
a first sector head maintaining a first prior address received at the input;
a second sector head maintaining a second prior address received at the input;
an exclusive-or module operable to associate the received address with a sector head, perform an exclusive-or operation between the received address and the prior address stored in the associated sector head and communicate the result of the exclusive-or operation to the output.

20. The encoder of claim 19, wherein the selection module is further operable to select a subset of the plurality of bits from the received address and to select a sector head based, at least in part, on the subset of the plurality of bits.

21. The encoder of claim 20, wherein the selection module is further operable to associate the first sector head with a first sector in address space and the second sector head with a second sector in address space.

22. The encoder of claim 21, further comprising:
a third sector head maintaining a third prior address received at the input;
a fourth sector head maintaining a fourth prior address received at the input; and
a selection module operable to select one of the four sector heads to be associated with the received address.

23. The encoder of claim 22, wherein the selection module is further operable to select a subset of the plurality of bits from the received address and select one of the four sector heads based, at least in part, on the subset of the plurality of bits.

24. An encoder comprising:
an input operable to receive an address;
an output coupled to an address bus;
a first sector head maintaining a first prior address received at the input;
a second sector head maintaining a second prior address received at the input;
a third sector head maintaining a third prior address received at the input;
a fourth sector head maintaining a fourth prior address received at the input;
a first multiplexer operable to select a first offset address based on either the first prior address or the second prior address;
a second multiplexer operable to select a second offset address based on either the third prior address or the fourth prior address; and
a selection module operable to compute a first offset between the received address and the first offset address, compute a second offset between the received address and the second offset address, select the first offset in response to the first offset being less than the second offset, select the second offset in response to the first offset not being less than the second offset, create an irredundant codeword based, at least in part, on the selected offset, and communicate the codeword to the output.

* * * * *

UNITED STATES PATENT AND TRADEMARK OFFICE
CERTIFICATE OF CORRECTION

PATENT NO. : 6,834,335 B2  
DATED : December 21, 2004  
INVENTOR(S) : Fallah et al.

It is certified that error appears in the above-identified patent and that said Letters Patent is hereby corrected as shown below:

<u>Title page,</u>  
Item [56], References Cited, OTHER PUBLICATIONS, "S. Iman, M. Pedram" reference, after "Proc." delete "Of" and insert -- of --.  
Item [57], ABSTRACT,  
Line 4, after "bus." insert -- The encoder and decoder may support logical partitioning of a memory space using fixed sector encoding or dynamic sector encoding, potentially coupled with other techniques such as reductions in the frequency of binary ones, transition signaling, and others. --.

<u>Column 3,</u>  
Line 52, after "if($X \geq 0$)" delete "LSB-Inv(X)=X" and insert on a new line with indention -- LSB-Inv(X)=X --.

<u>Column 4,</u>  
Line 64, after "30 to bit 1" insert -- . --.

Signed and Sealed this

Eleventh Day of April, 2006

JON W. DUDAS  
*Director of the United States Patent and Trademark Office*